(12) United States Patent
Miller et al.

(10) Patent No.: US 11,213,988 B2
(45) Date of Patent: Jan. 4, 2022

(54) METHODS AND MACHINES FOR MAKING ORAL PRODUCTS

(71) Applicant: Altria Client Services LLC, Richmond, VA (US)

(72) Inventors: Carl Gregory Miller, Richmond, VA (US); Charles Lester Dendy, Ruther Glen, VA (US); Jeremy J. Straight, Midlothian, VA (US); Gregory James Griscik, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 16/942,102

(22) Filed: Jul. 29, 2020

(65) Prior Publication Data
US 2020/0353662 A1 Nov. 12, 2020

Related U.S. Application Data

(60) Continuation of application No. 16/266,573, filed on Feb. 4, 2019, now Pat. No. 10,744,694, which is a
(Continued)

(51) Int. Cl.
*B29C 48/00* (2019.01)
*B29C 48/07* (2019.01)
(Continued)

(52) U.S. Cl.
CPC ........ *B29C 48/0022* (2019.02); *A23G 3/0021* (2013.01); *A23G 3/0023* (2013.01);
(Continued)

(58) Field of Classification Search
CPC ... B29C 48/0022; B29C 48/92; B29C 48/022; B29C 48/07; B29C 48/0011;
(Continued)

(56) References Cited

U.S. PATENT DOCUMENTS 3,083,432 A * 4/1963 Hely .................... C11D 13/28
264/210.2
4,094,056 A 6/1978 Takeda et al.
(Continued)

FOREIGN PATENT DOCUMENTS

WO WO-2011/081725 A1 7/2011

OTHER PUBLICATIONS

International Preliminary report on Patentability in International Application No. PCT/US2014/024791, dated Sep. 24, 2015, 9 Pages.
(Continued)

*Primary Examiner* — Joseph S Del Sole
*Assistant Examiner* — Lawrence D. Hohenbrink, Jr.
(74) *Attorney, Agent, or Firm* — Harness, Dickey & Pierce, P.L.C.

(57) ABSTRACT

A method of forming an oral product includes extruding a mixture, conveying the extruded mixture through one or more pairs of forming rollers, and cutting the extruded mixture into one or more oral products. The mixture can include polymer and at least one flavorant, sweetener, active ingredient, or combination thereof. The extruded mixture forms an extrudate having a predetermined cross-sectional shape. The one or more pairs of forming rollers abut to define a passage there between as each forming roller rotates. The passage has a cross-sectional shape corresponding to the predetermined cross-sectional shape. The method can be performed using a machine including an extruder, one or more pairs of forming rollers, and a cutting device.

20 Claims, 8 Drawing Sheets

Related U.S. Application Data continuation of application No. 16/106,065, filed on Aug. 21, 2018, now Pat. No. 10,195,777, which is a division of application No. 14/206,688, filed on Mar. 12, 2014, now Pat. No. 10,093,058.

(60) Provisional application No. 61/786,326, filed on Mar. 15, 2013.

(51) Int. Cl.

| | | |
|---|---|---|
| *B29C 48/92* | (2019.01) | |
| *A23G 3/02* | (2006.01) | |
| *A23G 3/34* | (2006.01) | |
| *A24B 15/16* | (2020.01) | |
| *A24B 15/12* | (2006.01) | |
| *A24B 15/24* | (2006.01) | |
| *A24B 15/14* | (2006.01) | |
| *B29C 48/12* | (2019.01) | |

(52) U.S. Cl.
CPC ............ *A23G 3/0247* (2013.01); *A24B 15/16* (2013.01); *B29C 48/0011* (2019.02); *B29C 48/022* (2019.02); *B29C 48/07* (2019.02); *B29C 48/92* (2019.02); *A23G 3/0242* (2013.01); *A24B 15/12* (2013.01); *A24B 15/14* (2013.01); *A24B 15/243* (2013.01); *B29C 48/00* (2019.02); *B29C 48/001* (2019.02); *B29C 48/12* (2019.02); *B29C 2948/00* (2019.02); *B29C 2948/926* (2019.02); *B29C 2948/92647* (2019.02); *B29C 2948/92923* (2019.02)

(58) Field of Classification Search
CPC ....... B29C 48/001; B29C 48/12; B29C 48/00; B29C 2948/92647; B29C 2948/926; B29C 2948/92923; A23G 3/0021; A23G 3/0023; A23G 3/0247; A23G 3/0242; A24B 15/16; A24B 15/12; A24B 15/14; A24B 15/243
USPC ................. 264/40.7, 151; 131/111, 359, 352
See application file for complete search history.

(56) References Cited

U.S. PATENT DOCUMENTS

| | | |
|---|---|---|
| 4,217,650 A | 8/1980 | Kuchler |
| 4,487,731 A | 12/1984 | Kobayashi |
| 4,808,450 A * | 2/1989 | Guy .......................... B32B 5/18 |
| | | 428/31 |
| 5,088,364 A | 2/1992 | Stolzer |
| 5,395,575 A | 3/1995 | Stribbell et al. |
| 5,756,030 A | 5/1998 | Cykana et al. |
| 5,834,040 A | 11/1998 | Israel et al. |
| 6,301,785 B1 | 10/2001 | Kwiecien et al. |
| 7,055,419 B2 | 6/2006 | Sandberg |
| 7,332,186 B2 | 2/2008 | Jani et al. |
| 2009/0029018 A1 | 1/2009 | Elejalde et al. |
| 2009/0029019 A1 | 1/2009 | Jani |
| 2009/0269571 A1 | 10/2009 | Takaoka |
| 2011/0139164 A1 | 6/2011 | Mua et al. |
| 2011/0220130 A1 * | 9/2011 | Mua ....................... A24B 15/14 |
| | | 131/111 |
| 2012/0138074 A1 | 6/2012 | Cantrell et al. |
| 2013/0186419 A1 | 7/2013 | Gao et al. |

OTHER PUBLICATIONS

International Search Report and Written Opinion in International Application No. PCT/US2014/024791, dated Jun. 26, 2014, 12 pages.

* cited by examiner

METHODS AND MACHINES FOR MAKING ORAL PRODUCTS

CROSS REFERENCE TO RELATED APPLICATIONS

This is application is a continuation of U.S. application Ser. No. 16/266,573, filed Feb. 4, 2019, which is a continuation application of U.S. application Ser. No. 16/106,065, filed Aug. 21, 2018, which is a divisional application of U.S. application Ser. No. 14/206,688, filed Mar. 12, 2014; which claims the benefit of priority under 35 U.S.C. § 119(e) to, U.S. Application No. 61/786,326, filed Mar. 15, 2013, the entire contents of each of which are hereby incorporated by reference.

TECHNICAL FIELD

This document relates to methods and machines for cutting extruded material into individual pieces.

BACKGROUND

Oral products providing flavor and/or one or more active ingredients are well known. One such oral product is chewing gum (e.g., nicotine gum). Other oral products include hard candies (e.g., mints). Softer gelatin-based oral products are also known. Pharmaceutical and therapeutic products (e.g., cough-suppressant lozenges) can also be provided in a solid form for oral consumption. Smokeless tobacco products can also be provided in a number of different forms. The flavor release and/or active agent release characteristics for an oral product are important for providing an improved consumer product.

SUMMARY

This specification provides methods and machines for extruding a mixture of a polymer and one or more flavorants, sweeteners, and/or actives to form an extrudate having a predetermined cross-section, passing the extrudate through at least one pair of forming rollers, and cutting material from the extrudate to form a plurality of oral products. In some cases, the oral product can provide an extended additive release time. The oral product includes a body that is at least partially receivable in an oral cavity of a consumer. In some cases, the oral product includes a mouth-stable polymer matrix, cellulosic fibers embedded in the stable polymer matrix, and one or more additives dispersed in the body such that it is released when the body is received within the oral cavity and exposed to saliva.

A machine provided herein for cutting an extrudate can include a plurality of forming rollers that pair and abut to form a passage therebetween. The passage can have a predetermined cross-sectional shape. In some cases, the passage can have a shape corresponding to the cross-sectional shape of the extrusion die. In some cases, passage of a first pair of forming rollers has a passage that is larger than the cross-sectional shape of the extrusion die, which can account for an expansion of the extrudate as it leaves the extrusion die. In some cases, a first pair of forming rollers can have the same cross-sectional shape and same dimensions as that of the extrusion die, which can correct for any deformation and/or expansion of the extrudate between the extrusion die and the first pair of forming rollers. In some cases, a plurality of pairs of forming rollers each has a passage therebetween having the same cross-sectional shape and same dimensions. In some cases, a plurality of pairs of forming rollers can get progressively smaller as a function of distance from an extrusion die. The forming rollers can be driven by a drive motor. In some cases, a gear train can be used with the drive motor to rotate each roller at the same speed. The drive motor and gear train can maintain a rotation of each forming roller at a speed consistent with the speed of the extrudate as it exits the extrusion die. The forming rollers can transport the soft extrudate from the extrude die to a cutting section while maintaining a desired uniform cross-sectional shape of the extrudate or reshaping the extrudate to have a uniform cross-sectional shape. The forming rollers can also allow the soft extrudate to cool and become more rigid prior to the cutting section, which can prevent a cutting operation from deforming the cross-sectional shape of the oral products as they are cut from the extrudate. In some cases, the machine provided herein can include one or more holding rollers positioned between an extrusion die and a first pair of forming rollers.

A cutting section of the machine provided herein can include a cutting ledger to support the extrudate as it is cut. In some cases, the cutting ledger includes channels there through to allow for the passage of a heat exchange fluid (e.g., cooled water) there through in order to control a temperature of the cutting ledger. The cutting section of the machine provided herein can include a cutting blade. The cutting blade can be a rotary cutting blade operated by a motor. In some cases, the rotary cutting blade can be rotated at a continuous speed. In some cases, the rotary cutting blade can be intermittent. Intermittent motion of the blade can be controlled on a time basis or can be controlled by a sensor that detects the position of the extrudate. For example, a sensor can detect a leading edge of the extrudate and a signal form the sensor can be used to actuate a rotary motion of the cutting blade, which can allow for uniform oral products to be cut form the extrudate regardless of the rate at which the extrudate is being fed into the cutting section. A programmable logic controller can be used to sequence and control the various operations, such as the speed of the extrudate as it exits the extrusion die, the speed of rotation of the forming rollers, and the speed or actuation of the cutting blade.

The passages of the forming rollers and/or the extrusion die can have a variety of different shapes. In some cases, the passages of the forming rollers and/or the extrusion die can be circular, shield-shaped, or rectangular. In some cases, the passages of the forming rollers and/or the extrusion die can have a maximum diameter and a minimum diameter of between 5 mm and 25 mm.

A method provided herein can include passing the extrudate as it exits an extruder through a plurality of pairs of forming rollers such that the section of the extrudate passing through a final pair of forming rollers has a temperature of less than 10 degrees Celsius below the glass transition temperature of a polymer material forming a matrix of the extrudate. In some cases, the forming rollers can impart a desired surface texture to the extrudate. A method provided herein can include maintaining a uniform cross-sectional shape of the extrudate as it passes through the plurality of the pairs of forming rollers. A method provided herein can include further cooling the extrudate in a cutting ledger after the extrudate passes through a final pair of forming rollers prior to cutting the extrudate. A method provided herein can include cutting the extrudate with a cutting blade that is actuated by a sensor that detects a position of a leading edge of the extrudate. In some cases, the cutting blade can be timed or actuated to produce oral products having a thickness of between 1 mm and 10 mm.

The oral product can include flavorants, sweeteners, vitamins, minerals, therapeutic agents, nutraceuticals, energizing agents, soothing agents, coloring agents, amino acids, chemesthetic agents, antioxidants, food grade emulsifiers, pH modifiers, botanicals, teeth whitening agents, and/or alkaloids (e.g., nicotine, caffeine). Combinations of additives (e.g., sweeteners, flavorants, and caffeine) can be combined to provide a favorable tactile and flavor experience. The oral product, in some cases, includes nicotine or a derivative thereof. The oral product can provide a tobacco-like flavor experience and favorable tactile experience. Combinations of additives (e.g., sweeteners, flavorants, and nicotine) can be combined to provide a favorable tactile and flavor experience.

In some cases, the oral product can include tobacco plant tissue. In other cases, the oral product is substantially free of tobacco plant tissue. Nicotine can be included in an oral product that is substantially free of tobacco plant tissue. Nicotine included in an oral product can be either synthetic or derived from tobacco. In some cases, the oral product includes between 0.1 mg and 6 mg nicotine. The oral products can also include an additive selected from the group consisting of minerals, vitamins, dietary supplements, nutraceuticals, energizing agents, soothing agents, amino acids, chemesthic agents, antioxidants, botanicals, teeth whitening agents, therapeutic agents, or a combination thereof. The nicotine and/or other additives can be absorbed into the cellulosic fibers and polymer matrix.

The oral product body can have at least 10 weight percent cellulosic fibers. The cellulosic fibers can be derived from plant tissue. In some cases, the cellulosic fibers include cellulose. The cellulosic fibers can further include lignin and/or lipids. In some cases, the cellulosic fibers can include tobacco plant tissue (e.g., exhausted tobacco plant fibers). The cellulosic fibers can be non-tobacco cellulosic fibers. For example, the cellulosic fibers can be selected from the following: sugar beet fiber, wood pulp fiber, cotton fiber, bran fiber, citrus pulp fiber, grass fiber, willow fiber, poplar fiber, and combinations thereof. The cellulosic fibers may also be chemically treated prior to use. For example, the cellulosic fibers can be CMC, HPMC, HPC, or other treated cellulosic material.

The oral product can include flavorants. The flavorants can be natural or artificial. Flavorants can be selected from the following: licorice, wintergreen, cherry and berry type flavorants, Drambuie, bourbon, scotch, whiskey, spearmint, peppermint, lavender, cinnamon, cardamom, apium graveolents, clove, cascarilla, nutmeg, sandalwood, bergamot, geranium, honey essence, rose oil, vanilla, lemon oil, orange oil, Japanese mint, cassia, caraway, cognac, jasmine, chamomile, menthol, ylang-ylang, sage, fennel, piment, ginger, anise, coriander, coffee, mint oils from a species of the genus *Mentha*, cocoa, and combinations thereof. Synthetic flavorants can also be used. In some cases, a combination of flavorants can be combined to imitate a tobacco flavor. The particular combination of flavorants can be selected from the flavorants that are generally recognized as safe ("GRAS"). Flavorants can also be included in the oral product as encapsulated flavorants.

The oral product can also include a sweetener dispersed in the body. The sweetener can be saccharine, sucralose, aspartame, acesulfame potassium, or a combination thereof.

The oral product body can include at least 10 weight percent of the mouth-stable polymer. The mouth-stable polymer matrix can include polyurethane, silicon polymer, polyester, polyacrylate, polyethylene, poly(styrene-ethylene-butylene-styrene) ("SEBS"), poly(styrene-butadiene-styrene) ("SBS"), poly(styrene-isoprene-styrene)("SIS"), and other similar thermoplastic elastomers, or any copolymer, mixture, or combination thereof. The oral product can also include a plasticizer dispersed in the mouth-stable polymer matrix. For example, the plasticizer can be propylene glycol, glycerin, vegetable oil, triglycerides, or a combination thereof.

The body of the oral product can have a variety of different shapes, some of which include disk, shield, rectangle, and square. According to certain embodiments, the body can have a length or width of between 5 mm and 25 mm and a thickness of between 1 mm and 10 mm.

The oral product body can be compressible and springy. In some cases, the body has a compressibility @ 250 N of less than 95%, less than 90%, less than 85%, or less than 80%. In some cases, the body has a compressibility of @ 250 N of between 45% and 90%. The body can have a compressibility @ 425 N of less than 99%. For example, the body can have a compressibility @ 425 N of between 60% and 98%. The body can also have a percentage of springiness of at least 20%, at least 30%, at least 40%, at least 50%, at least 60%, at least 70%, or at least 75%. For example, the body can have a percentage of springiness of between 75% and 90%.

The oral product can also include an antioxidant. In some cases, the oral product includes between 0.01 weight percent and 5.0 weight percent antioxidant. Suitable antioxidants include ascorbyl palmitate, BHT, ascorbic acid, sodium ascorbate, monosterol citrate, tocopherols, propyl gallate, tertiary butylhydroquinone (TBHQ), butylated hydroxyanisole (BHA), Vitamin E, and derivatives thereof. The combination of antioxidant and nicotine can reduce the formation of nicotine-N-oxide.

The oral product can include a combination of soluble fibers and insoluble cellulosic fibers. In some cases, a ratio of soluble fiber to cellulosic fibers can be between 1:60 and 60:1. In some cases, the soluble fibers can include maltodextrin. In some cases, the soluble fibers comprise starch. The soluble fibers can be derived from corn. In general, another aspect of the subject matter described in this specification is methods of making and using the oral product. The methods of making the oral product can include the actions of extruding a mouth-stable polymer having cellulosic fibers and/or one or more additives dispersed therein.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Machines and methods for forming oral products are provided herein. The oral products can include a mouth-stable polymer matrix and one or more additives. The additives can include flavorants, sweeteners, active ingredients, or any other suitable ingredient intended to be released from the oral product when the oral product is received within the oral cavity and exposed to saliva. The oral products can provide a favorable additive release profile and tactile experience. The methods and machines provided herein can produce oral products have uniform dimensions. In some cases, the oral products can have smooth surfaces. In some cases, the oral products can have textured surfaces. The methods and machines provided herein can produce oral products that provide an extended and controlled release of additives within the polymer matrix.

Cutting an extrudate as it exits an extrusion die is a typical way to make pellets of extruded material. Cutting an extrudate intended for use as an oral product, however, can result in a deformation of the material such that it does not have the desired dimensions. This can occur due to the different velocities of the extruded material as a function of distance from the extrusion die wall. In particular, the extruded material along the extrusion die wall can have a lower velocity than material in the middle of the extrudate. Attempts to cut the material at the extrusion die can thus result in the formation of a dome after the cut is made, rather than a flat face. Additionally, the differences in velocity can result in an uneven surface texture. Moreover, the deformation of the material can result in sharp edges that can provide an unpleasant mouth feel. The machines and methods provided herein, however, allow for oral products having desired dimensions to be reliably produced. The oral products can have flat cut faces. The oral products can have consistent and desired surface properties. The oral products can have uniform cross-sectional shapes and/or uniform thicknesses. Uniform dimensions, and thus uniform weights, can also provide products that consistently provide predetermined amounts of one or more additives and/or consistent release properties.

The machine provided herein includes or couples to an extruder and provides a positive transfer of the extrudate from the extrusion die to a cutting section of the machine. The machine further maintains and/or reshapes the cross-sectional shape of the extrudate as it solidifies to provide a uniform cross-sectional shape of the extrudate as it reaches the cutting section. The cutting section can provide a clean cut to the extrudate to provide a plurality of oral products have uniform dimensions.

Figure 1A:
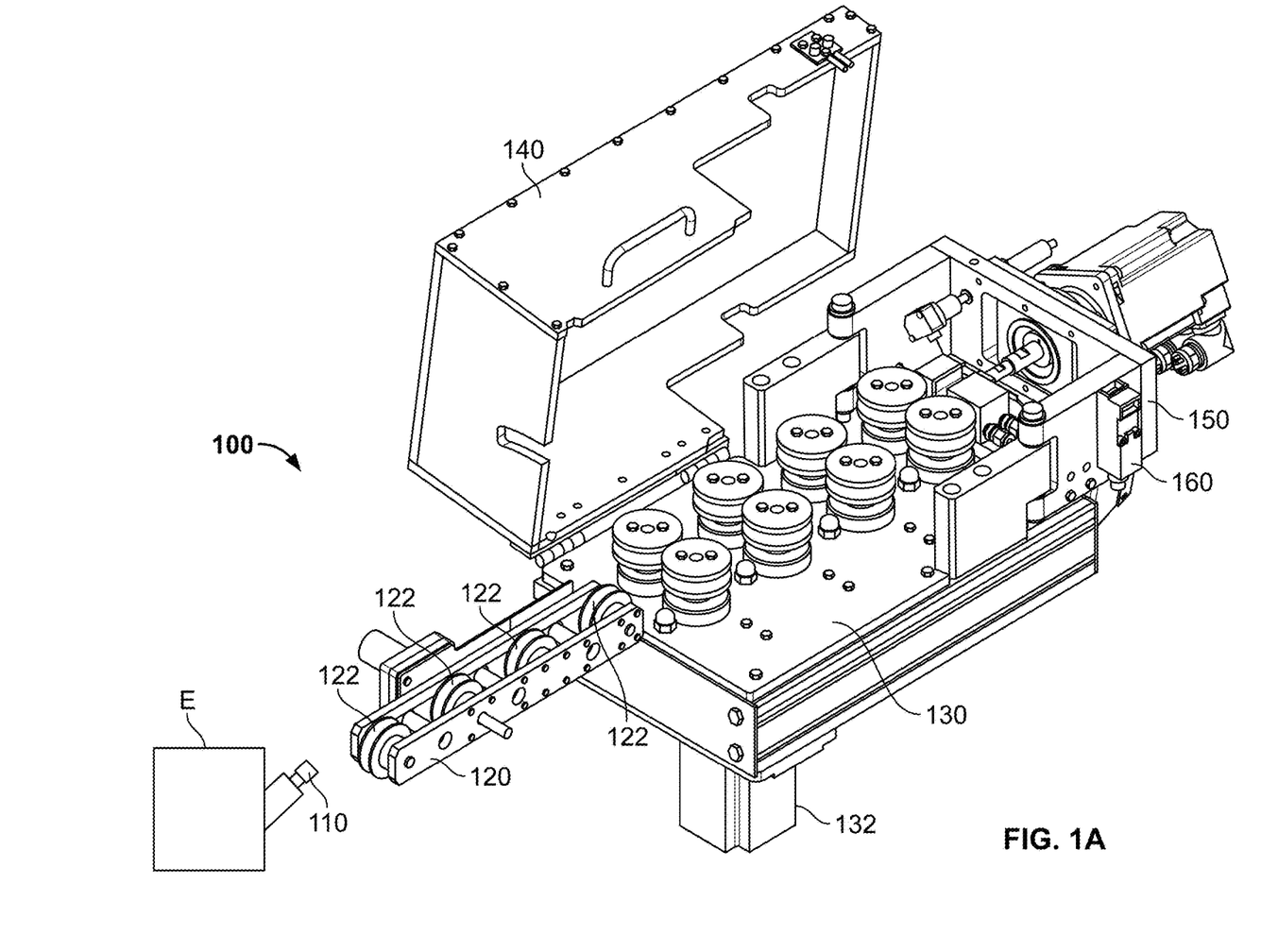
FIG. 1A is a perspective view of a machine used to shape and cut oral products.
Figure 1B:
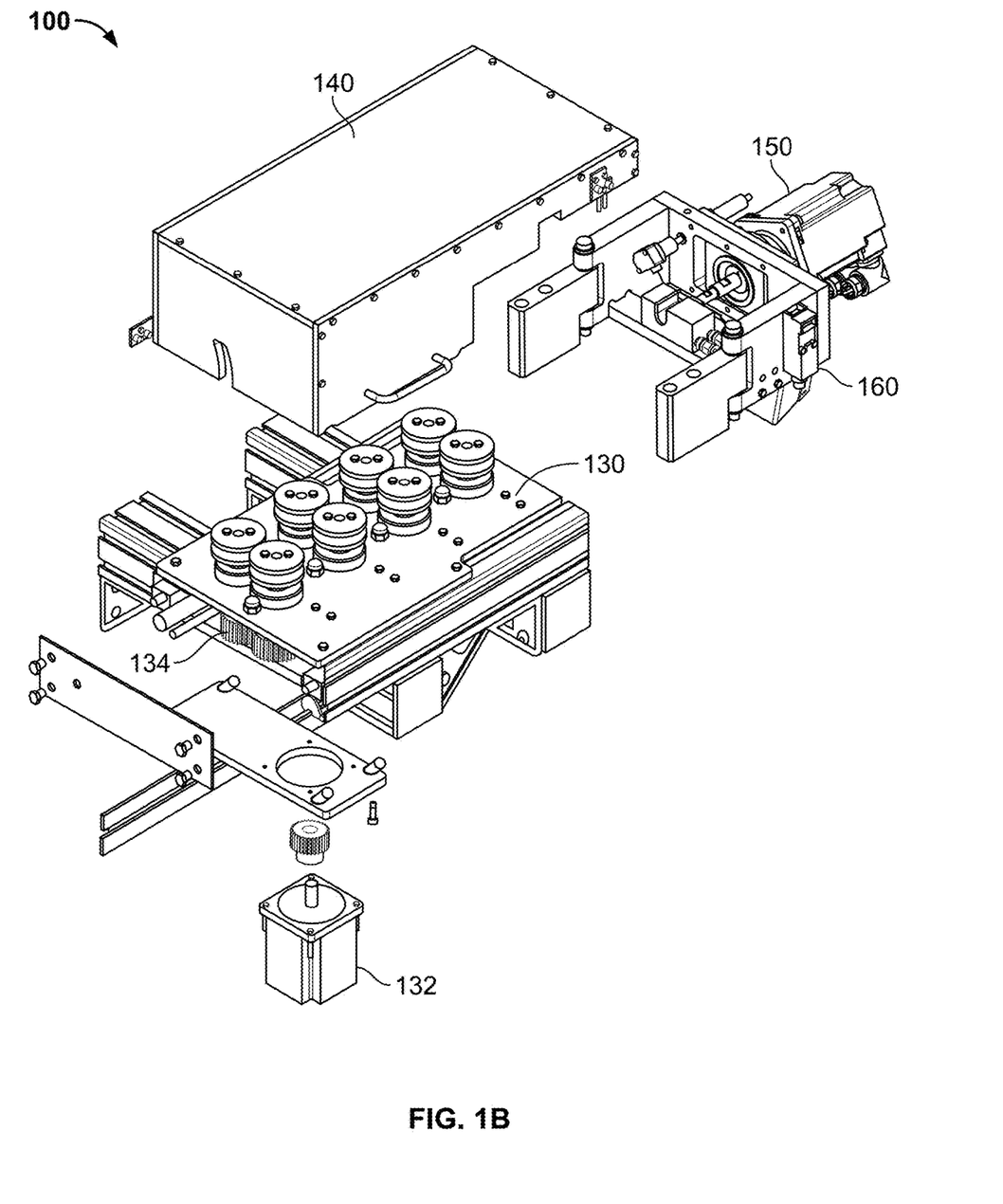
FIG. 1B is an expanded view of the machine of FIG. 1A.

FIGS. 1A and 1B depict an exemplary machine 100 used to produce oral products. As shown, the machine can be positioned adjacent to an extruder E such that an extrudate exiting an extrusion die 110 is received by a holding section 120 including a plurality of holding rollers 122. Adjacent to the holding section 120 is a forming section 130 including a plurality of pairs of forming rollers. The plurality of pairs of forming rollers can be driven by a drive motor 132 and a gear train 134. Adjacent to the forming section 130 is a cutting section 150, where the extrudate can be cut into a plurality of oral products. The machine 100 can include a cover 140 that sits over the forming section 130 and the cutting section 150. The cover 140 can be retractable so that an extrudate can be threaded through the forming rollers and into the cutting section 150 during start up or repair. In some cases, the machine 100 includes an actuator system to open up the forming rollers to facilitate the threading of the extrudate through the machine 100 during start up or repair.

Holding section 120 is optional. In some case, the extrusion die 110 can be positioned so that the extrudate leaving the extrusion die 110 immediately passes into a first pair of forming rollers. The holding rollers 122 of holding section 120 can support the extrudate as it exits the extrusion die 110 and is pushed/pulled to the forming section 130. In some cases, the holding rollers 122 can spin freely so that they move with the movement of the extrudate. In some cases, the holding rollers 122 can be driven so that they provide positive transport of the extrudate from the extrusion die 110 to the forming section 130. The driven speed of the holding rollers 122 can be such that the surface speed of the holding rollers 122 is substantially equivalent to the linear speed at which the extrudate exits the extrusion die 110 and thus the cross sectional area of the extrudate is not significantly changed between the extrusion die 110 and the forming section 130. The driven speed of the holding rollers 122 can be such that the surface speed of the holding rollers 122 is greater than the linear speed at which the extrudate exits the extrusion die 110 and thus the cross sectional area of the extrudate is reduced between the extrusion die 110 and the forming section 130. The driven speed of the holding rollers 122 can also be such that the surface speed of the holding rollers 122 is less than the speed at which the extrudate exits the extrusion die 110 and thus the cross sectional area of the extrudate is increased between the extrusion die 110 and the forming section 130. An outer surface of each holding roller 122 can include a groove for receiving the extrudate so that the extrudate does not fall off of the holding rollers 122. In some cases, the groove can generally correspond to a portion of a cross-sectional shape of the extrudate.

Figure 2A:
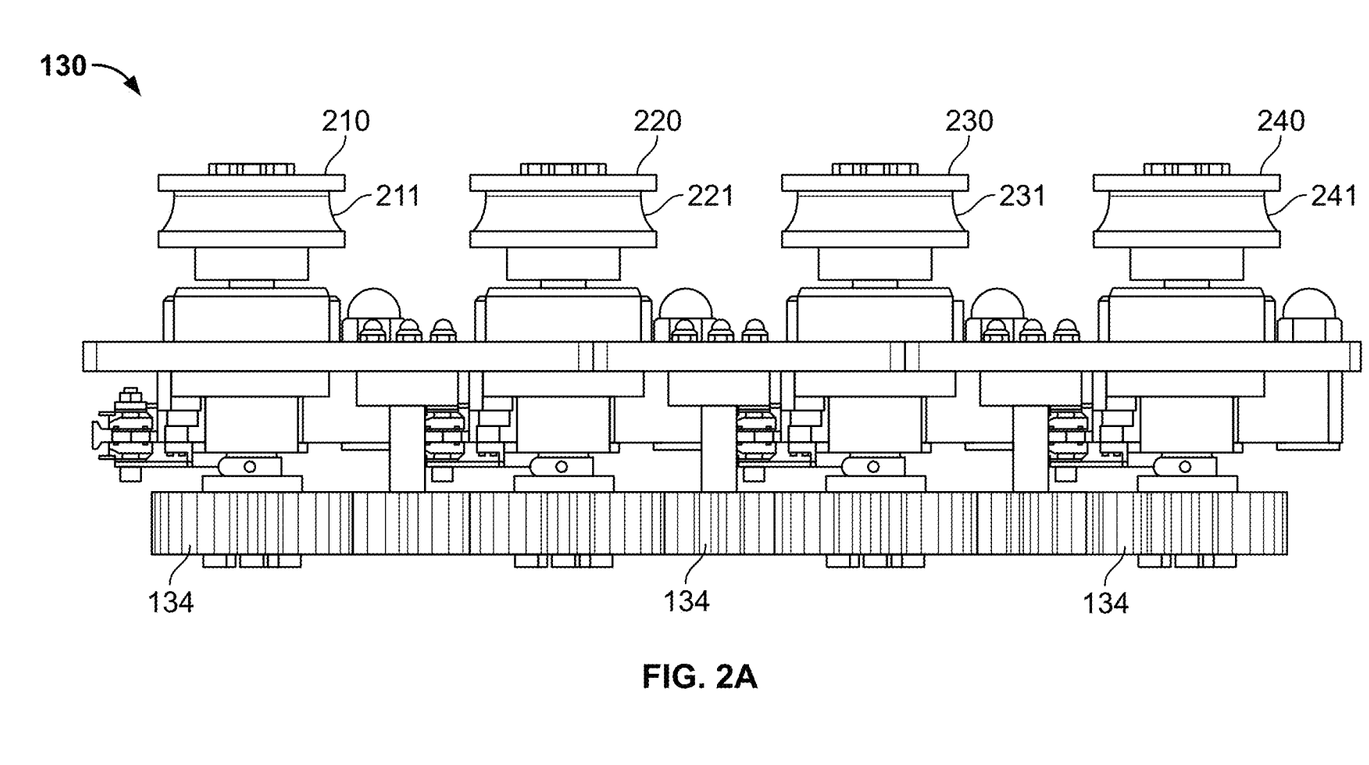
FIGS. 2A-2C depict a forming roller section of the machine of FIG. 1A.
Figure 2B:
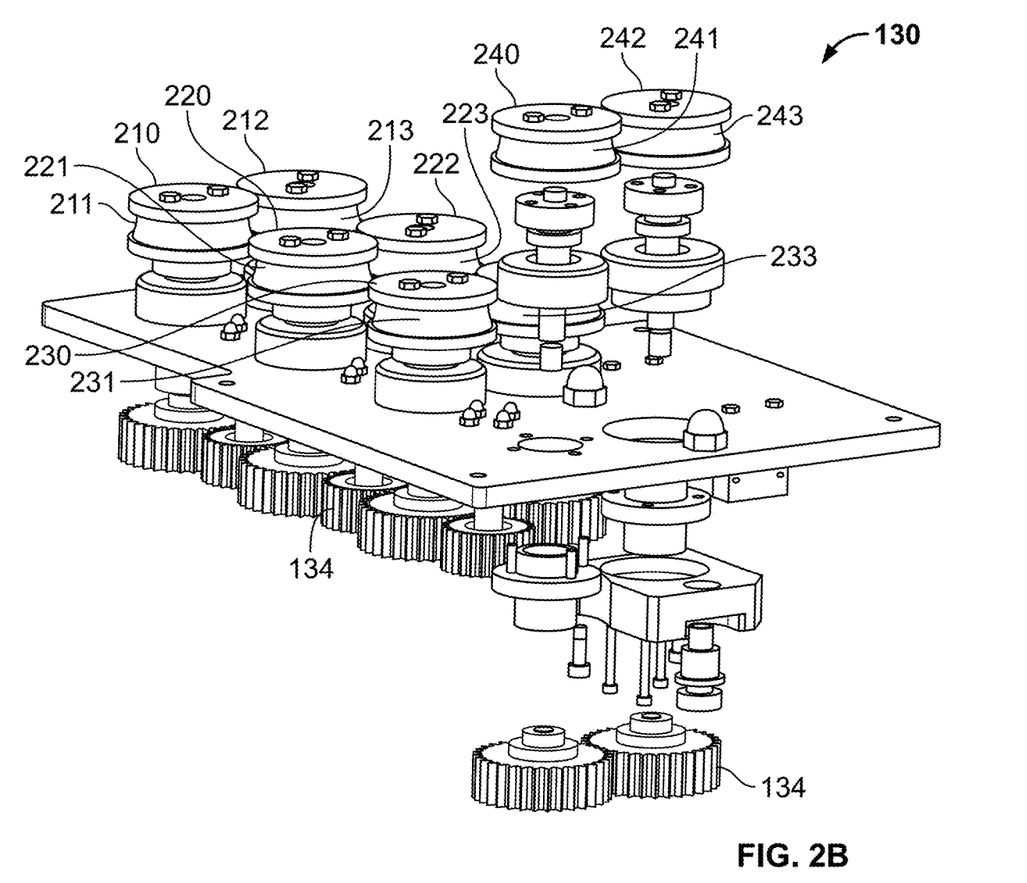
Figure 2C:
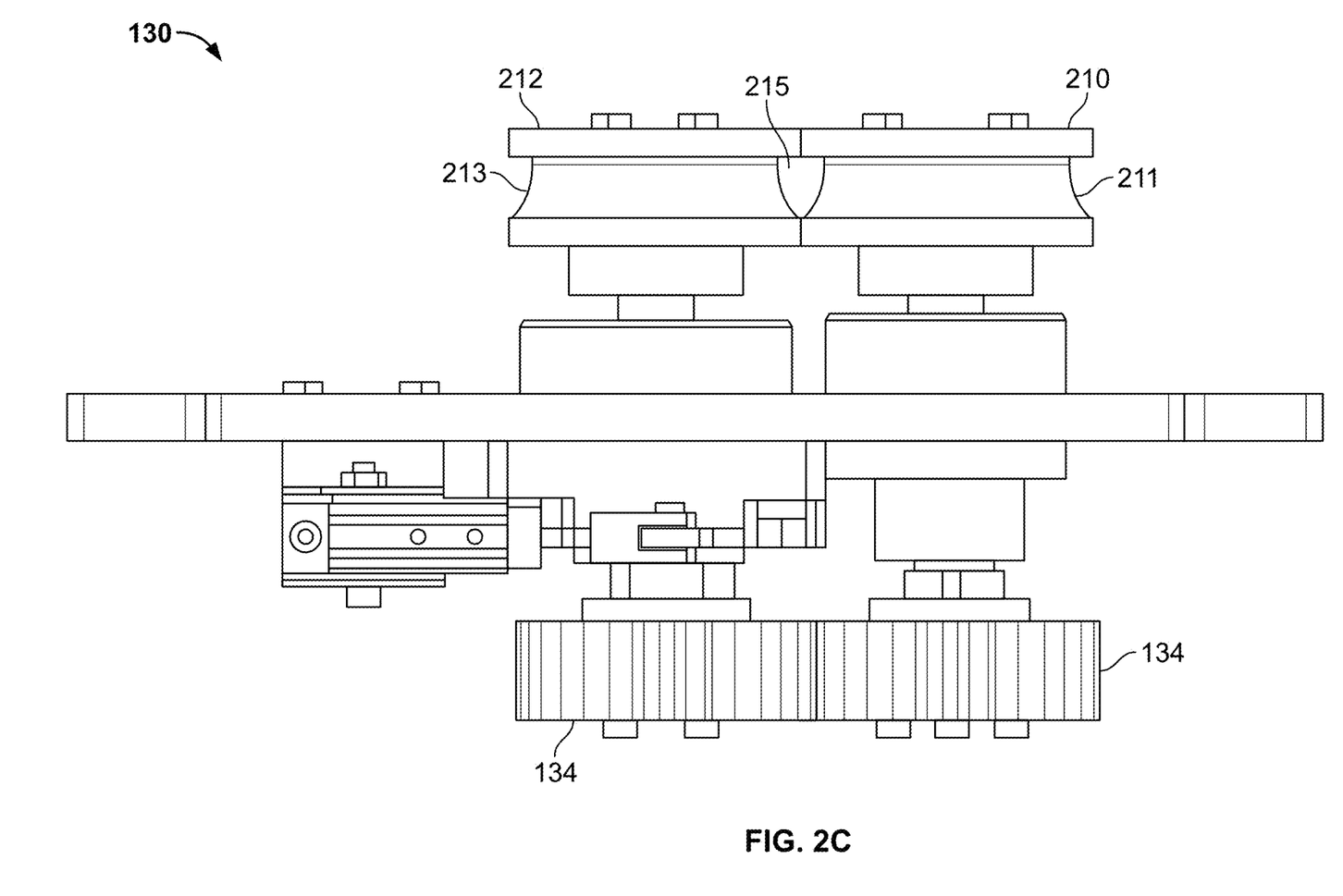

FIGS. 2A-2C depict different views of forming section 130. The forming section 130 includes at least one pair of forming rollers. In some cases, the forming section includes at least two pairs of forming rollers, at least three pairs of forming rollers, or at least four pairs of forming rollers. The machine depicted in FIGS. 1A, 1B, and 2A-2C includes four pairs of forming rollers 210, 212, 220, 222, 230, 232, 240, and 242. Each forming roller includes a groove 211, 213, 221, 223, 231, 233, 241, and 243 along an outer surface of the forming roller. Each pair of forming rollers abuts such that a passage there between is formed. As shown in FIG. 2C a passage 215 is formed between forming rollers 210 and 212. The passages can maintain a constant cross-sectional shape as each forming roller rotates. The cross-sectional shape of passage (e.g., 215) between the pairs of forming rollers can correspond to the shape of the extrudate and/or to the cross-sectional shape of the extrusion die 110. In some cases, the passages between forming rollers can have a total cross-sectional area that is within 25% of the cross-sectional area of the extrudate entering the forming section 130 or the cross-sectional area of extrusion die 110. In some cases, the passage between each pair has the same cross-sectional shape and the same dimensions. In some cases, each successive passage can have slightly different dimensions. In some cases, each successive passage is reduced in cross-sectional area by between 0.1% and 10%. In some cases, each successive passage is reduced in cross-sectional area by between 0.5% and 5%. For example, each successive passage can be reduced by about 1%, about 3%, or about 5% in cross-sectional area.

The forming rollers can each be driven by one or more motors. For example, as shown in FIGS. 1A, 1B, and 2A-2C, a single drive motor 132 can drive the forming rollers using a gear train 134. The gear train 134 can cause each pair of forming rollers to rotate at the same speed. In some cases, independent motors can be used for each pair of forming rollers or each forming roller. In some cases, the gear train 134 or independent motors can be used to cause each pair of forming rollers to rotate at a different speed. These variations in speed, combined with variations in the cross sectional shape and dimensions of the passages (e.g., 215) between the pairs of forming rollers can be used to change the cross sectional shape and dimensions of the extrudate. The rotation of the forming rollers can provide a positive transfer of the extrudate to the cutting section. The forming rollers can be controlled (e.g., by a programmable logic controller 160) to rotate such that the outer linear speed of each forming roller is approximately equal to the linear speed at which the extrudate exits the extrusion die 110. The positive transfer can allow for the extrudate to maintain a uniform cross-sectional shape and for any surface defects to be reshaped while the extrudate is solidifying such that the relative velocities of the material in the extrudate move at the same velocities. The driven speed of the forming rollers (e.g., 210 and 212) can be such that the surface speed of the forming rollers (e.g., 210 and 212) is substantially equivalent to the linear speed at which the extrudate exits the extrusion die 110 or the holding rollers 122 and thus the cross sectional area of the extrudate is not significantly changed between the extrusion die 110 or the holding rollers 122 and the cutting section 150. The driven speed of the forming rollers (e.g., 210 and 212) can be such that the surface speed of forming rollers (e.g., 210 and 212) is greater than the linear speed at which the extrudate exits the extrusion die 110 or the holding rollers 122 and thus the cross sectional area of the extrudate is reduced between the extrusion die 110 or the holding rollers 122 and the cutting section 150. The driven speed of the forming rollers (e.g., 210 and 212) can also be such that the surface speed of the forming rollers (e.g., 210 and 212) is less than the speed at which the extrudate exits the extrusion die 110 or the holding rollers 122 and thus the cross sectional area of the extrudate is increased between the extrusion die 110 or the holding rollers 122 and the cutting section 150.

The passages (e.g., 215) between the forming rollers can maintain the extrudates constant cross-sectional shape and/or reshape the extrudate. As shown, passage 215 has a shield shape, which can be used to create an oral product 410L such as that shown in FIG. 5L. In some case, the passages can have other shapes, such as shapes the correspond to the shapes of the products depicted in FIGS. 4 and 5A-5L, which are discussed below.

Figure 3:
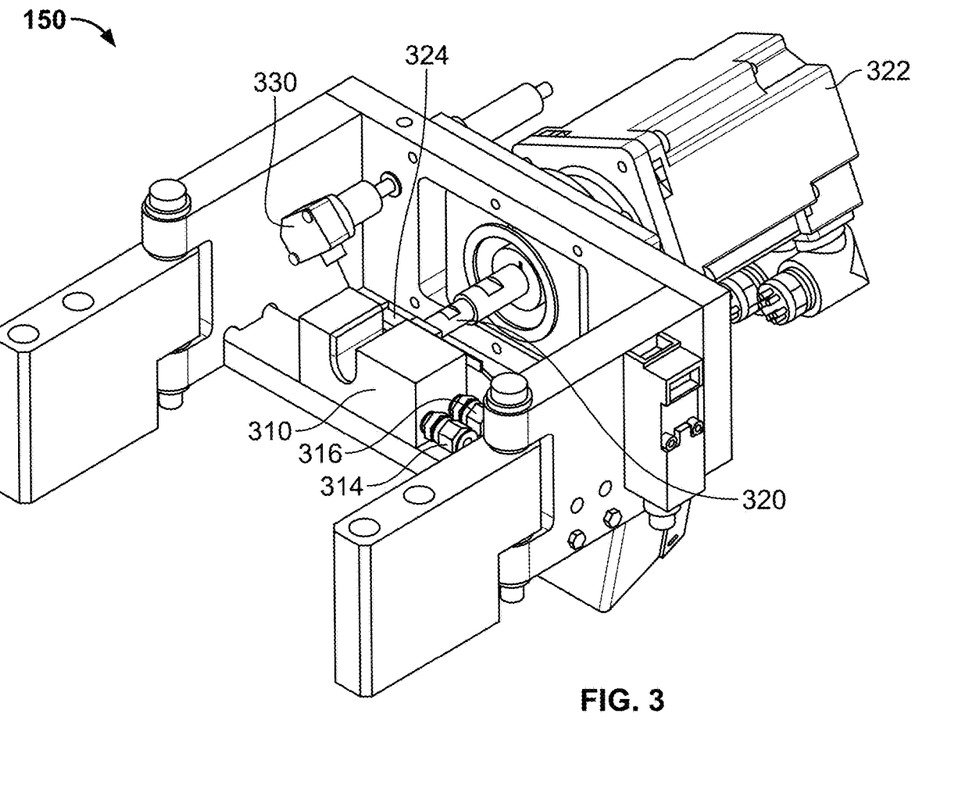
FIG. 3 is a perspective view of a cutting section of the machine of FIG. 1A.

The cutting section 150 receives the extrudate from the forming section 130. FIG. 3 depicts an exemplary cutting section 150, that includes a cutting ledger 310 adapted to support the extrudate as it is cut and a cutting device 320 having a cutting blade 324. The cutting ledger 310 can included a grooved surface adapted to receive the extrudate. The cutting blade 324 can form a shearing abutment with the cutting ledger 310 in order to facilitate a clean cut. The cutting ledger 310 can be adapted to further cool the extrudate. For example, the cutting ledger 310 can include channels there through for receiving a cooling fluid (e.g., cooling water) from a supply line 314. The cooling fluid can exit the cutting ledger 310 through exit line 316. In some cases, the combination of the different rollers and/or the cutting ledger 310 can cool the extrudate to a temperature of at least 1° C. less than the glass transition temperature of the polymer forming the matrix of the extrudate. In some cases, the combination of the different rollers and/or the cutting ledger 310 can cool the extrudate to a temperature of at least 5° C. less than the glass transition temperature of the polymer forming the matrix of the extrudate. In some cases, the combination of the different rollers and/or the cutting ledger 310 can cool the extrudate to a temperature of at least 10° C. less than the glass transition temperature of the polymer forming the matrix of the extrudate.

The cutting blade 324 can be actuated by a drive motor 322. In some cases, the cutting blade can operate with a continuous rotary motion timed based on the extrusion speed and/or the forming roller speeds. In some case, the cutting blade 324 can be intermittently rotated. The intermittent motion of a cutting blade 324 can be time controlled based on the extrusion speed and/or the forming roller speeds. In some cases, intermittent motion of a cutting blade 324 can be controlled (e.g., a programmable logic controller 160) based on a sensor 330 detecting a position of the extrudate. For example, a sensor 330 can detect a leading edge of the extrudate and actuate the cutting device 320 once the leading edge of the extrudate is a certain distance past the leading edge of the cutting ledger 310. In some cases, the sensor 330 can be a laser sensor. In some cases, a programmable logic controller can control the motion of the cutting blade 324 based on the sensor 330, information about the extrusion speed, and/or information about the forming roller speeds.

A programmable logic controller 160 can be part of the machine 100 to sequence and/or control the various operations. In some cases, the programmable logic controller 160 can be a computer coupled to the machine 100.

Oral Product Shapes and Packaging

Figure 4:
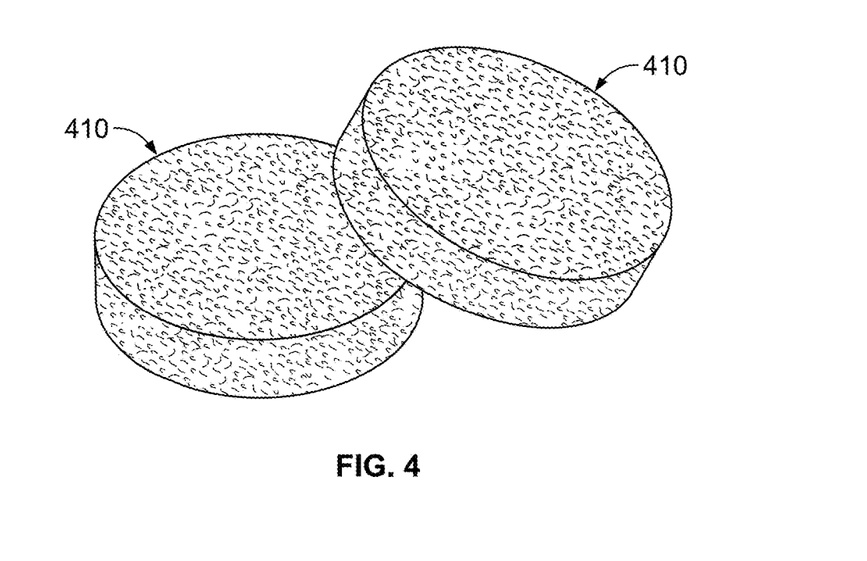
FIG. 4 is a perspective view of a pair of oral products.
Figure 5A:
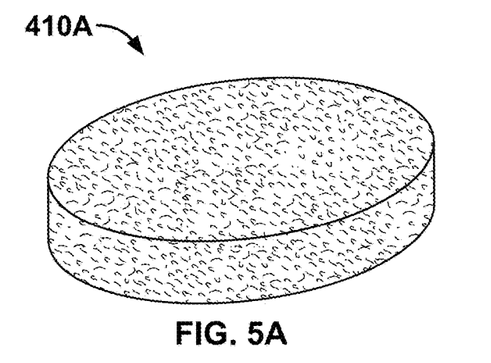
FIGS. 5A-5L illustrate various exemplary shapes of oral products.
Figure 5B:
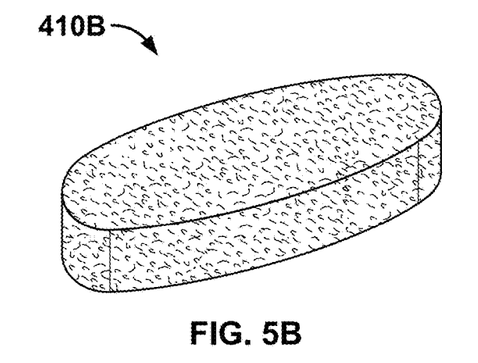
Figure 5C:
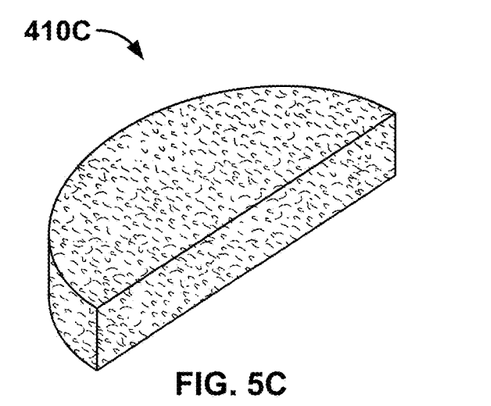
Figure 5D:
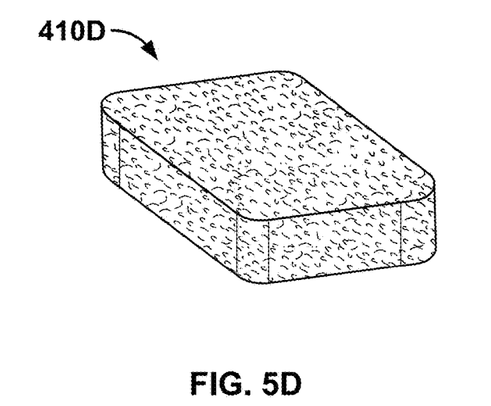
Figure 5E:
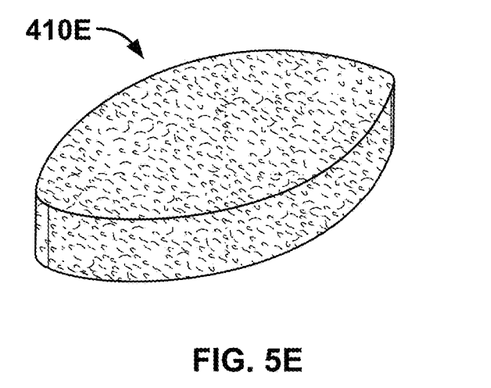
Figure 5F:
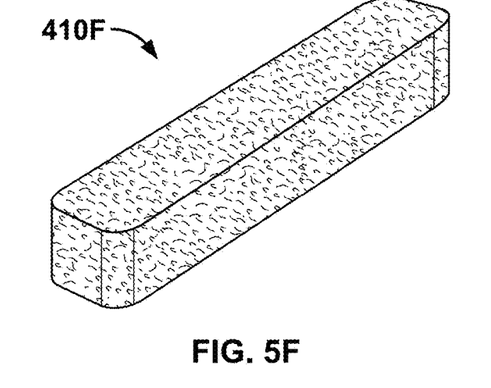
Figure 5G:
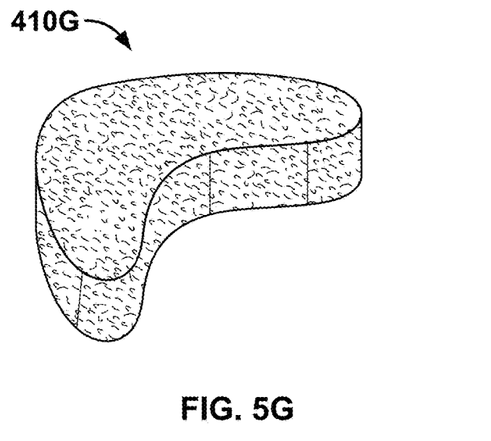
Figure 5H:
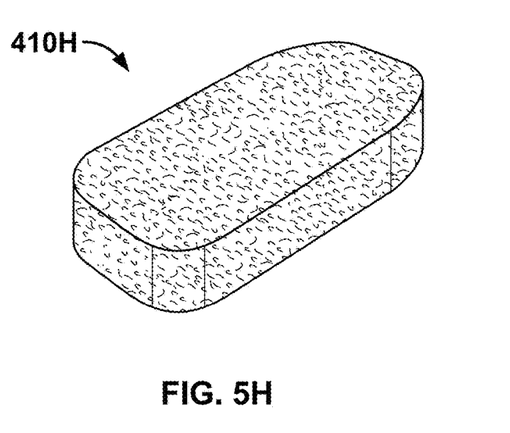
Figure 5I:
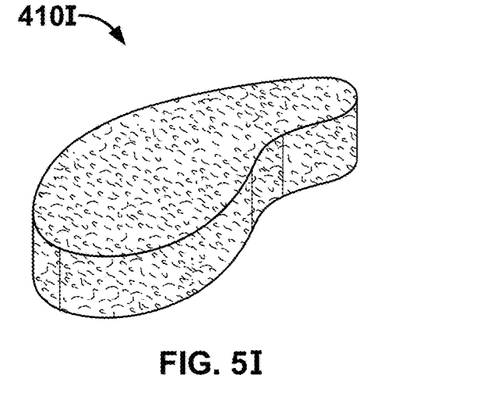
Figure 5J:
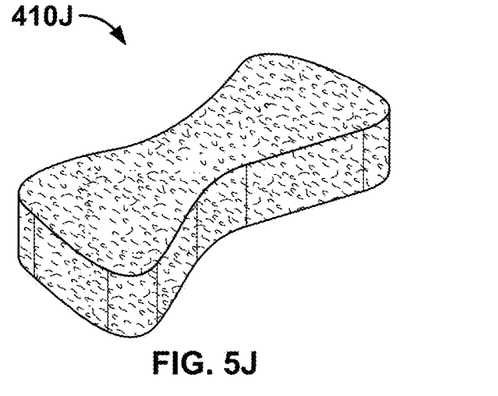
Figure 5K:
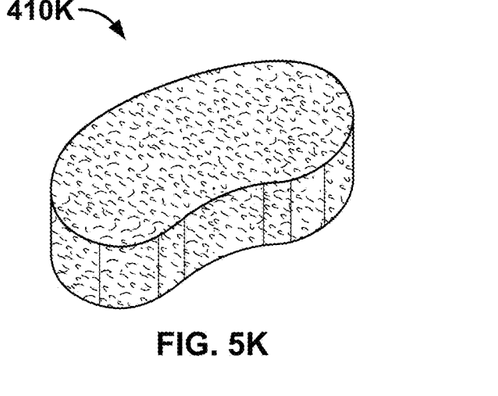
Figure 5L:
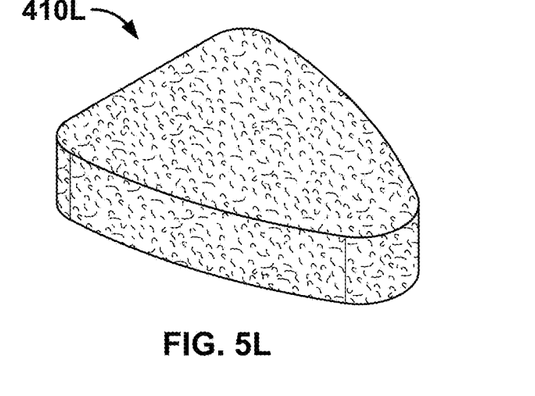

FIG. 4 depicts an example of an oral product 410. The oral product 410 has a disk shape. For example, the oral product 410 can have a diameter of about 12 mm and a thickness of about 2.5 mm. The oral products can be molded into any other desired shape. For example, referring to FIGS. 5A-5L, the oral product 410A-L can be formed in a shape that promotes improved oral positioning in the oral cavity, improved packaging characteristics, or both. In some circumstances, the oral product 410A-L can be configured to be: (A) an elliptical-shaped oral product 410A; (B) an elongated elliptical-shaped oral product 410B; (C) semi-circular oral product 410C; (D) square or rectangular-shaped oral product 410D; (E) football-shaped oral product 410E; (F) elongated rectangular-shaped oral product 410F; (G) boomerang-shaped oral product 410G; (H) rounded-edge rectangular-shaped oral product 410H; (I) teardrop- or comma-shaped oral product 410I; (J) bowtie-shaped oral product 410J; (K) peanut-shaped oral product 410K; and (L) shield-shaped oral product 410L.

One or more oral products 410 or 410A-L can be packaged in a variety of conventional and non-conventional manners. For example, a plurality of oral products 410 or 410A-L can be packaged in a container having a lid. In some cases, a plurality of oral products 410 or 410A-L can be stacked and packaged in a paper, plastic, and/or aluminum foil tube. The packaging can have a child-resistant lid. The oral product 410 or 410A-L can also include additional elements. In some cases, a mouth-stable polymer matrix including nicotine or a derivative thereof can be attached to a rod, tube, or stick.

Other Materials

The extrudate and thus the resulting oral products 410 or 410A-L include at least one polymer and one or more additives. The additives can be flavorants, sweeteners, active ingredients, or any other substance intended to be released when placed within a mouth. The ingredients listed below are merely illustrative and non-limiting.

Polymers

In some cases, the polymer can be a mouth-stable polymer. Suitable mouth-stable polymers include thermoplastic elastomers such as polyurethane. As used here, the term "mouth stable" means that the polymer does not appreciably dissolve or disintegrate when exposed to saliva within an oral cavity and at the normal human body temperature (e.g., about 98.6° F.) over a period of one hour. In addition to biostable polymers, mouth-stable polymers can include biodegradable polymers that breakdown over periods of days, weeks, months, and/or years, but do not appreciably break down when held in an oral cavity and exposed to saliva for a period of one hour. In some cases, the mouth-stable polymer is stable within an oral cavity and exposed to saliva at the normal human body temperature for a period of at least 6 hours, at least 12 hours, at least 24 hours, or at least 2 days. Accordingly, the oral products described herein can remain intact when placed within an oral cavity during a use period. After use, the mouth-stable polymer matrix can be removed from the oral cavity and discarded.

The mouth-stable polymer can be a variety of different biocompatible and biostable polymers. In some cases, the mouth-stable polymer is a polymer generally recognized as safe by an appropriate regulatory agency. In some cases, the polymer is a thermoplastic polymer. The polymer can also be a thermoplastic elastomer. For example, suitable mouth-stable polymers include polyurethanes, silicon polymers, polyesters, polyacrylates, polyethylenes, polypropylenes, polyetheramides, polystyrenes (e.g., acrylonitrile butadiene styrene (HIPS)) polyvinyl alcohols, polyvinyl acetates, polyvinyl chlorides, polybutyl acetates, butyl rubbers (e.g., polyisobutylenes), SEBS, SBS, SIS, and mixtures and copolymers thereof. In some cases, the mouth-stable polymer is food-grade or medical-grade polymers (e.g., medical-grade polyurethane).

The mouth-stable polymer forms the mouth-stable polymer matrix of the extrudate and the resulting oral products 410 or 410A-L. In some cases, the extrudate includes at least 10 weight percent of one or more mouth-stable polymers. In some cases, the extrudate includes at least 20 weight percent, at least 30 weight percent, at least 40 weight percent, at least 50 weight percent, at least 60 weight percent, at least 70 weight percent, at least 80 weight percent, or at least 90 weight percent of one or more mouth-stable polymers. In some cases, the extrudate includes between 10 and 90 weight percent of one or more mouth-stable polymers. Accordingly to some embodiments, the extrudate includes between 40 and 80 weight percent of the mouth-stable polymers.

The mouth-stable polymer according to certain embodiments has a flexural modulus of at least 5 MPa when tested according to ASTM Testing Method D790 or ISO 178 at 23 degrees Celsius. In some cases, the flexural modulus is at least 10 MPa. For example, the flexural modulus can be between 10 MPa and 30 MPa. In some cases, the mouth-stable polymer is a grade that complies with food-contact regulations applicable in one or more countries (e.g., US FDA regulations). In some cases, the mouth-stable polymer can be a polyurethane, SIS, or other thermal plastic elastomer meeting the requirements of the FDA-modified ISO 10993, Part 1 "Biological Evaluation of Medical Devices" tests with human tissue contact time of 30 days or less. The mouth-stable polymer can have a shore Hardness of 50D or softer, a melt flow index of 3 g/10 min at 200° C./10 kg, a tensile strength of 10 MPa or more (using ISO 37), and a ultimate elongation of less than 100% (using ISO 37).

Additives

A variety of additives can be included in the extrudate. The additives can include alkaloids (e.g., caffeine, nicotine), minerals, vitamins, dietary supplements, nutraceuticals, energizing agents, soothing agents, coloring agents, amino acids, chemesthetic agent, antioxidants, food grade emulsifiers, pH modifiers, botanicals (e.g., green tea), teeth whitening (e.g., SHRIMP), therapeutic agents, sweeteners, flavorants, and combinations thereof. In some cases, the additives include nicotine, sweeteners, and flavorants. In some cases, the nicotine can be tobacco derived nicotine. With certain combinations of nicotine, sweeteners, and flavorants, the oral product may provide a flavor profile and tactile experience similar to certain tobacco products.

The extrudate can also include one or more antioxidants. Antioxidants can result in a significant reduction in the conversion of nicotine into nicotine-N-oxide when compared to oral products without antioxidants. In some cases, the extrudate can include 0.01 and 5.00 weight percent antioxidant, between 0.05 and 1.0 weight percent antioxidant, between 0.10 and 0.75 weight percent antioxidant, or between 0.15 and 0.5 weight percent antioxidant. Suitable examples of antioxidants include ascorbyl palmitate (a vitamin C ester), BHT, ascorbic acid (Vitamin C), and sodium ascorbate (Vitamin C salt). In some cases, monosterol citrate, tocopherols, propyl gallate, tertiary butylhydroquinone (TBHQ), butylated hydroxyanisole (BHA), Vitamin E, or a derivative thereof can be used as the antioxidant. For example, ascorbyl palmitate can be the antioxidant in the formulations listed in Table I. Antioxidants can be incorporated into the polymer (e.g., polyurethane) during the extrusion process.

A variety of synthetic and/or natural sweeteners can be in the extrudate. Suitable natural sweeteners include sugars, for example, monosaccharides, disaccharides, and/or polysaccharide sugars, and/or mixtures of two or more sugars. According to some embodiments, the extrudate includes one or more of the following: sucrose or table sugar; honey or a mixture of low molecular weight sugars not including sucrose; glucose or grape sugar or corn sugar or dextrose; molasses; corn sweetener; corn syrup or glucose syrup; fructose or fruit sugar; lactose or milk sugar; maltose or malt sugar or maltobiose; sorghum syrup; mannitol or manna sugar; sorbitol or d-sorbite or d-sorbitol; fruit juice concentrate; and/or mixtures or blends of one or more of these ingredients. The extrudate can also include non-nutritive sweeteners. Suitable non-nutritive sweeteners include: stevia, saccharin; Aspartame; sucralose; or acesulfame potassium.

The extrudate can optionally include one or more flavorants. The flavorants can be natural or artificial. For example, suitable flavorants include wintergreen, cherry and berry type flavorants, various liqueurs and liquors (such as Drambuie, bourbon, scotch, and whiskey) spearmint, peppermint, lavender, cinnamon, cardamom, apium graveolents, clove, cascarilla, nutmeg, sandalwood, bergamot, geranium, honey essence, rose oil, vanilla, lemon oil, orange oil, Japanese mint, cassia, caraway, cognac, jasmine, chamomile, menthol, ylang ylang, sage, fennel, pimenta, ginger, anise, coriander, coffee, liquorish, and mint oils from a species of the genus *Mentha*, and encapsulated flavors. Mint oils useful in particular embodiments of the oral product 110 include spearmint and peppermint. Synthetic flavorants can also be used. In some cases, a combination of flavorants can be combined to imitate a tobacco flavor. The particular combination of flavorants can be selected from the flavorants that are generally recognized as safe ("GRAS") in a particular country, such as the United States. Flavorants can also be included in the oral product as encapsulated flavorants.

In some cases, the flavorants in the extrudate are limited to less than 20 weight percent in sum. In some cases, the flavorants in the extrudate are limited to be less than 10 weight percent in sum. For example, certain flavorants can be included in the extrudate in amounts of about 1 weight percent to 5 weight percent.

The extrudate may optionally include other additives. For example, these additives can include non-nicotine alkaloids, dietary minerals, vitamins, dietary supplements, therapeutic agents, and fillers. For example, suitable vitamins include vitamins A, B1, B2, B6, C, D2, D3, E, F, K, and P. For example, an extrudate can include C-vitamins with nicotine. Suitable dietary minerals include calcium (as carbonate, citrate, etc.) or magnesium (as oxide, etc.), chromium (usually as picolinate), and iron (as bis-glycinate). One or more dietary minerals could be included in an extrudate with or without the use of other additives. Other dietary supplements and/or therapeutic agents can also be included as additives.

In some cases, an oral product can be made to include a therapeutic agent that is preferable absorbed transbuccally. For example, certain therapeutic agents do not significantly pass into the blood stream if they are swallowed. Exemplary therapeutic agents that can be included in an extrudate provided herein can include Gerd, Buprenorphin, Nitroglycerin, Diclofenac, Fentanyl, Carbamazepine, Galantamine, Acyclovir, Polyamidoamine Nanoparticles, Chlorpheniramine, Testosterone, Estradiol, Progesterone, Calcitonin, Fluorouracil, Naltrexone, Odansetron, Decitabine, Selegiline, Lamotrigine, and Prochlorperazine. For example, an oral product can include Buprenorphine and be used for pain treatment. In some cases, an oral product can include Nitroglycerin and be used for Angina Pectoris treatment. Because of the release properties of the oral product, therapeutic agents included therein can be released at a rate such that a majority of the therapeutic agent is absorbed transbuccally, rather than swallowed.

The extrudate can also include fillers such as starch, di-calcium phosphate, lactose, sorbitol, mannitol, and microcrystalline cellulose, calcium carbonate, dicalcium phosphate, calcium sulfate, clays, silica, glass particles, sodium lauryl sulfate (SLS), glyceryl palmitostearate, sodium benzoate, sodium stearyl fumarate, talc, and stearates (e.g., Mg or K), and waxes (e.g., glycerol monostearate, propylene glycol monostearate, and acetylated monoglycerides), stabilizers (e.g., ascorbic acid and monosterol citrate, BHT, or BHA), disintegrating agents (e.g., starch, sodium starch glycolate, cross caramellose, cross linked PVP), pH stabilizers, or preservatives. In some cases, the amount of filler in the oral product 110 is limited to less than 10 weight percent in sum. In some cases, the amount of filler in the extrudate is limited to be less than 5 weight percent in sum. In some cases, the fillers are mouth stable. In some cases, the fillers can dissolve or disintegrate during use and thus result in an oral product that becomes more pliable during use.

Fibers

The extrudate can include fibers within the mouth-stable polymer matrix. In some cases, the extrudate includes between 5 weight percent and 50 weight percent fibers. When in the oral product, the fibers can provide passages in the mouth-stable polymer matrix, which can permit certain additives within the polymer matrix to be released into an oral cavity when the oral product is received in an oral cavity and exposed to saliva. The fibers can be cellulosic fibers. The cellulosic fibers can be derived from plant tissue. In some cases, the cellulosic fibers include cellulose. The cellulosic fibers can further include lignin and/or lipids. Suitable sources for cellulosic fibers include wood pulp, cotton, sugar beets, bran, citrus pulp fiber, switch grass and other grasses, *Salix* (willow), tea, and *Populus* (poplar). In some cases, the cellulosic fibers can be chopped or shredded plant tissue comprising various natural flavors, sweeteners, or active ingredients. In some cases, the oral product 110 can include nicotine as an additive (optionally with additional sweeteners and flavors) and non-tobacco cellulosic fiber, and thus be substantially free of tobacco plant tissue.

The cellulosic fibers can have a variety of dimensions. The dimensions of the fibers (in addition to the amount) can impact the release characteristics of the additives. For example, cellulosic fibers can be hydrophilic, thus water soluble additives (e.g., nicotine) can preferentially be absorbed in fiber-polymer matrix. The release profile of nicotine from a polyurethane oral product can be impacted by both the fiber sizes and the amounts of fiber. In some cases, the cellulosic fiber can be processed to have an average fiber size of less than 200 micrometers. In particular embodiments, the fibers are between 75 and 125 micrometers. In some cases, the fibers are processed to have a size of 75 micrometers or less.

The extrudate can also include soluble fibers. The soluble fibers can be adapted to dissolve when exposed to saliva when the oral product is received in an oral cavity. In some cases, the soluble fiber can be a maltodextrin. The maltodextrin can be derived from corn. For example, Soluble Dietary Fiber can be included in an extrudate. Soluble fibers can be used alone or with cellulosic fibers to provide channels for additives to be released from the oral product. As the soluble fibers dissolve, the oral product can become more flexible and the additional channels can open up to permit the release of additional additive deposits. Suitable soluble fibers include psyllium fibers. In some cases, the fibers can be partially soluble. For example, sugar beet fibers can partially dissolve during use.

In some cases, an oral product 110 can include a combination of soluble and insoluble fibers. The ratio of soluble to insoluble fiber can impact the softness of texture of the oral product. The ratio of soluble to insoluble fiber can also impact the compressibility of the oral product. In some cases, a ratio of soluble to insoluble fiber is between 1:60 and 60:1. In some cases, the ratio of soluble to insoluble fiber is greater than 1:50, greater than 1:40, greater than 1:30, greater than 1:20, greater than 1:10, or greater than 1:5. In some cases, the ratio of soluble to insoluble fiber is less than 1:1, less than 1:2, less than 1:5, less than 1:10, less than 1:20, or less that 1:30. In some case, an oral product having a mixture of soluble and insoluble fibers can have a percentage of compression @ 250 N of between 60 percent and 98 percent, between 65 percent and 95 percent, between 70 percent and 90 percent, or between 80 and 89 percent.

Plasticizers

The extrudate can also include one or more plasticizers. Plasticizers can soften the final oral product and thus increase its flexibility. Plasticizers work by embedding themselves between the chains of polymers, spacing them apart (increasing the "free volume"), and thus significantly lowering the glass transition temperature for the plastic and making it softer. Suitable plasticizers include propylene glycol, glycerin, vegetable oil, and medium chain triglycerides. In some cases, the plasticizer can include phthalates. Esters of polycarboxylic acids with linear or branched aliphatic alcohols of moderate chain length can also be used as plasticizers. Moreover, plasticizers can facilitate the extrusion processes described below. In some cases, the extrudate can include up to 20 weight percent plasticizer. In some cases, the extrudate includes between 0.5 and 10 weight percent plasticizer, the extrudate can include between 1 and 8 weight percent plasticizer, or between 2 and 4 weight percent plasticizer. For example, an oral product comprising a polyurethane polymer matrix and include about 3 to 6.5 weight percent of propylene glycol.

Other Embodiments

It is to be understood that, while the invention has been described herein in conjunction with a number of different aspects, the foregoing description of the various aspects is intended to illustrate and not limit the scope of the invention, which is defined by the scope of the appended claims. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed.

What is claimed is:

1. A method of forming an oral product comprising:
   extruding a mixture to form an extrudate, the mixture including a polymer and an additive, the additive including a flavorant, a sweetener, an active ingredient, or any combination thereof;
   passing the extrudate through a first passage defined between a first pair of forming rollers, the first passage having a first cross-sectional area;
   passing the extrudate through a second passage defined between a second pair of forming rollers, the second passage having a second cross-sectional area different than the first cross-sectional area; and
   cutting the extrudate to form the oral product.

2. The method of claim 1, wherein the second cross-sectional area is smaller than the first cross-sectional area.

3. The method of claim 2, wherein the second cross-sectional area is reduced by an amount ranging from 0.1% to 10% compared to the first cross-sectional area.

4. The method of claim 3, wherein the amount ranges from 0.5% to 5%.

5. The method of claim 1, wherein the first passage and the second passage are shield shaped.

6. The method of claim 1, the cutting is performed at a temperature of at least 1° C. less than a glass transition temperature of the polymer.

7. The method of claim 1, the cutting is performed at a temperature of at least 5° C. less than a glass transition temperature of the polymer.

8. The method of claim 1, the cutting is performed at a temperature of at least 10° C. less than a glass transition temperature of the polymer.

9. The method of claim 1, wherein the cutting includes, detecting a position of the extrudate, and
   based on the position, rotating a cutting blade to cut the extrudate.

10. The method of claim 1, wherein the passing the extrudate through the first pair of forming rollers includes imparting a desired surface texture to the extrudate.

11. The method of claim 1, wherein the passing the extrudate through the first pair of forming rollers includes changing a cross-sectional shape of the extrudate.

12. The method of claim 1, further comprising:
    translating the extrudate on a plurality of holding rollers prior to the passing.

13. A method of forming an oral product comprising:
    discharging an extrudate from an extruder at a first linear speed, the extrudate including a polymer and an additive, the additive including a flavorant, a sweetener, an active ingredient, or any combination thereof;
    translating the extrudate on a plurality of holding rollers at a second linear speed different from the first linear speed;
    passing the extrudate through a pair of forming rollers; and
    cutting the extrudate to form the oral product.

14. The method of claim 13, wherein the second linear speed is greater than the first linear speed such that the translating includes reducing a cross-sectional area of the extrudate.

15. The method of claim 13, wherein the second linear speed is less than the first linear speed such that the translating includes increasing a cross-sectional area of the extrudate.

16. The method of claim 13, wherein the translating includes disposing the extrudate at least partially within grooves defined in an outer surface of each holding roller.

17. The method of claim 13, the cutting is performed at a temperature of at least 1° C. less than a glass transition temperature of the polymer.

18. The method of claim 13, wherein the cutting includes, detecting a position of the extrudate, and
    based on the position, rotating a cutting blade to cut the extrudate.

19. The method of claim 13, wherein the passing the extrudate through the pair of forming rollers includes imparting a desired surface texture to the extrudate.

20. The method of claim 13, wherein the passing the extrudate through the pair of forming rollers includes changing a cross-sectional shape of the extrudate.

* * * * *